(12) United States Patent
Macfarlane (10) Patent No.: US 7,548,491 B2
(45) Date of Patent: Jun. 16, 2009

(54) PERSONALIZED KEY SYSTEM FOR A MOBILE VEHICLE

(75) Inventor: Jane F. Macfarlane, Oakland, CA (US)

(73) Assignee: General Motors Corporation, Detroit, MI (US)

( * ) Notice: Subject to any disclaimer, the term of this patent is extended or adjusted under 35 U.S.C. 154(b) by 1315 days.

(21) Appl. No.: 10/171,123

(22) Filed: Jun. 13, 2002

(65) Prior Publication Data
US 2003/0231550 A1 Dec. 18, 2003

(51) Int. Cl.
H04Q 1/00 (2006.01)
(52) U.S. Cl. ............. 367/198; 340/825.69; 340/5.72; 379/102.01
(58) Field of Classification Search ............ 340/825.69, 340/5.64, 5.72, 995.1, 995.18, 995.24, 426, 340/426.1, 425.5; 307/10.1, 9.1; 367/198; 701/206–211, 26, 36, 300; 455/456–459
See application file for complete search history.

(56) References Cited

U.S. PATENT DOCUMENTS

| 5,371,901 | A | * | 12/1994 | Reed et al. ..................... 455/69 |
| 5,652,570 | A | * | 7/1997 | Lepkofker ............... 340/573.4 |
| 5,864,297 | A | * | 1/1999 | Sollestre et al. ............ 340/5.23 |
| 6,073,101 | A | * | 6/2000 | Maes ......................... 704/275 |
| 6,091,162 | A | * | 7/2000 | Williams et al. ........... 307/10.1 |
| 6,127,922 | A | * | 10/2000 | Roddy et al. ........... 340/426.14 |
| 6,160,319 | A | * | 12/2000 | Marougi et al. ............. 307/10.5 |
| 6,249,060 | B1 | * | 6/2001 | Osha ......................... 307/10.1 |
| 6,249,215 | B1 | * | 6/2001 | Dilz et al. .............. 340/426.12 |
| 6,278,869 | B1 | * | 8/2001 | Lindenmeier et al. ..... 455/277.1 |
| 6,377,173 | B1 | * | 4/2002 | Desai ..................... 340/426.36 |
| 6,392,592 | B1 | * | 5/2002 | Johnson et al. ........ 342/357.07 |
| 6,496,107 | B1 | * | 12/2002 | Himmelstein ............ 340/426.1 |
| 6,501,516 | B1 | * | 12/2002 | Clapper ..................... 348/734 |
| 6,512,461 | B1 | * | 1/2003 | Benzie et al. .......... 340/825.22 |
| 6,539,358 | B1 | * | 3/2003 | Coon et al. .................. 704/275 |
| 6,568,495 | B1 | * | 5/2003 | Corder et al. .............. 180/69.2 |
| 6,693,517 | B2 | * | 2/2004 | McCarthy et al. ........ 340/425.5 |
| 6,704,564 | B1 | * | 3/2004 | Lange et al. ............. 455/412.1 |
| 6,724,322 | B2 | * | 4/2004 | Tang et al. .................. 340/989 |
| 6,765,497 | B2 | * | 7/2004 | Ablay et al. ................. 340/905 |
| 6,791,449 | B2 | * | 9/2004 | Dewan ....................... 340/5.25 |
| 6,885,285 | B2 | * | 4/2005 | Losey ......................... 340/5.72 |

FOREIGN PATENT DOCUMENTS

DE 19916308 A1 * 10/2000

OTHER PUBLICATIONS

Kelly Carroll, Data to ride shotgun: InfoMove helps connect cars to Internet, Telephony Dec. 13, 1999, Copyright 1999 by Primedia Business Magazines & Media Inc., "All Rights Reserved", Telephony, Spectrum; ISSN: 0040-2656, 1091 words.

(Continued)

Primary Examiner—Brian A Zimmerman (57) ABSTRACT

A wireless key system for a mobile vehicle includes a key fob with a controller, a microphone operably coupled to the controller, a memory operably coupled to the controller, arid a telematics unit operably coupled to a vehicle communication bus. Verbal commands received through the microphone initiate the controller to send a function message in accordance with instructions stored in the memory to the telematics unit that activates a function through the vehicle communication bus.

22 Claims, 4 Drawing Sheets

OTHER PUBLICATIONS

Seattle, InfoMove Delivers New Generation of Wireless Internet Services for the Car, Business Wire, Oct. 18, 1999, Copyright 1999 Business Wire, Inc. Business Wire, Business Editors/Technology Writers, 994 words.

Bob Low, Motoring in the new millennium on the Net, Daily Record, May 1, 1998, Copyright 1998 Scottish Daily Record & Sunday Mail Ltd., Daily Record May 1, 1998, Friday, p. 31 Road, 734 words.

Tarre Beach, New Products; Sidebar, Wireless Review Apr. 1, 2000, Copyright 2000 by Primedia Business Magazines & Media Inc., "All rights Reserved" Wireless Review, Apr. 1, 2000, New Products; ISSN: 1099-9248, 351 words.

Flint, Mich., Jan. 3, BUIC XP2000-A Concept Cat For The $21^{st}$ Century, PR Newswire, Jan. 3, 1995, Copyright 1995 PR Newswire Association, Inc. PR Newswire, Jan. 3, 1995, Tuesday, Financial News, (With Photo) To Business and Auto Editors, 2149 words.

\* cited by examiner

PERSONALIZED KEY SYSTEM FOR A MOBILE VEHICLE

FIELD OF THE INVENTION

This invention relates generally to data transmissions over a wireless communication system. More specifically, the invention relates to a wireless key system that includes a personalized key fob device for sending a voice command to a mobile vehicle to perform a requested function, as well as managing personal data and customized device functionality.

BACKGROUND OF THE INVENTION

Wireless communication services for mobile vehicles, such as navigation and roadside assistance, have increased rapidly in recent years and are expanding into new service areas. Most available telematics services apply to a motor vehicle in operation, but more recently, the demands and potential for communication, networking and diagnostic services have grown. Currently, the user who is outside the vehicle can control only a few vehicle and telematics functions, such as unlocking a door and setting or disabling a car alarm, with a wireless key or remote.

A system that offers greater customization and a larger variety of vehicle settings and service available to the user outside the vehicle would be of interest to many vehicle owners or to multiple users of the same vehicle. In such a system, these service and functions could include many more features than simply unlocking the car doors, features such as storing personalized comfort settings, running maintenance and diagnostic functions, accessing call-center information, updating controller systems, retrieving vehicle location, controlling the vehicle alarm, defrosting the windows in cold weather, and even placing telephone calls to talk or to transmit digital information from personal digital assistants (PDAs) and similar hand-held devices through a remote device. While inside or outside of the vehicle, the user would be able to change or increase services to the vehicle with relative ease of configuration and have greater anti-theft security. Services and system capabilities could be personalized, upgraded or changed with little or no change to the vehicle infrastructure, and potentially require no keyboard input or button pushing. The functions of the device could be key or voice-activated, and sufficiently compact for the user to conveniently carry in a purse or in a pocket. The system might even provide similar functionality as hand-held devices such as PDAs and cellular phones.

It is an object of this invention, therefore, to provide a system, device, and method to access and control functions of a mobile vehicle from inside or outside of the vehicle while adding enhanced features, personalization, data management, security and accessibility, and to overcome the deficiencies and obstacles described above.

SUMMARY OF THE INVENTION

One aspect of the invention provides a wireless key system for a mobile vehicle, including a key fob with a controller, a microphone operably coupled to the controller, and a memory operably coupled to the controller. The wireless key system also includes a telematics unit operably coupled to a vehicle communication bus. Verbal commands may be received through the microphone to initiate the controller to send a function message in accordance with instructions stored in memory to the telematics unit that activates a function through the vehicle communication bus. The system may also include a wireless communication device operably coupled to the controller and a docking mechanism in the mobile vehicle to receive the key fob.

Another aspect of the invention provides a method for communicating with a mobile vehicle to receive a voice command at a key fob, to determine a function message based on the voice command, and to send the function message from a telematics unit to perform a requested function.

Another aspect of the invention provides a computer usable medium including a program for communicating with a mobile vehicle. The program may include computer program code to receive a voice command at a key fob, to determine a function message based on the voice command, and to send the function message from a telematics unit to perform a requested function.

The aforementioned, and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
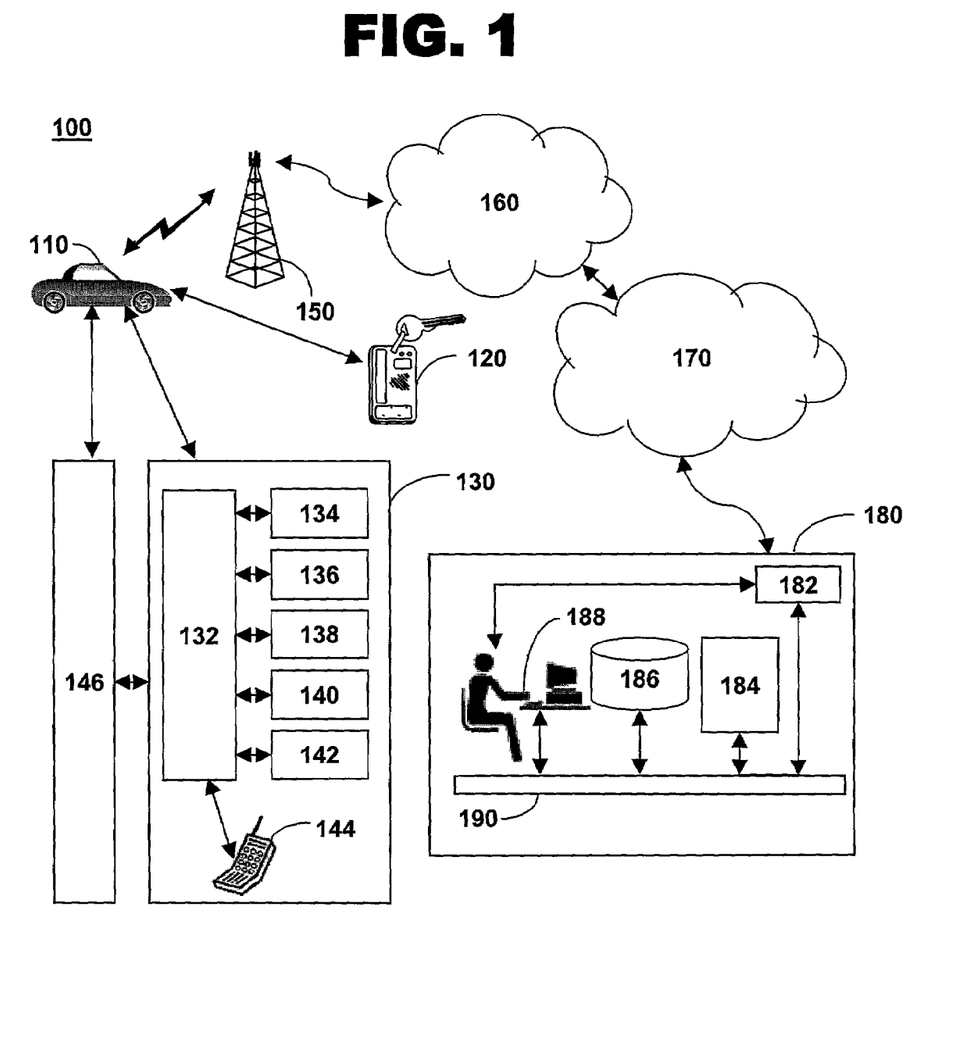
FIG. 1 shows an illustration of one embodiment of a wireless key system for communicating voice commands to a mobile vehicle using a key fob, in accordance with the current invention.

FIG. 1 shows an illustration of one embodiment of a wireless key system for communicating voice commands to a mobile vehicle using a wireless key fob, in accordance with the present invention at 100. The wireless key system and method employ wireless radio-frequency communications between the key fob and a telematics unit installed in a vehicle to perform various services and functions. The invention leverages the infrastructure of a vehicle communication bus and telematics unit, enabling functions to be performed directly in the vehicle. Other functions may be initiated and performed by using a wireless carrier or telematics service call center, which is connected wirelessly to the telematics unit.

The wireless key system, also known as a personalized key system, is able to communicate with and provide command requests to the vehicle with relative ease of configuration while the key fob is either docked in the vehicle or outside the vehicle within the range of a wireless communications device in the key fob. The system improves the availability of a vehicle to receive and perform a service or function request, as well as provides additional security with a personal identification number (PIN) and personalized information stored within the key fob.

Wireless key system 100 may include a mobile vehicle 110, a key fob 120, a communications controller or telematics unit 130, one or more wireless carrier systems 150, one or more communication networks 160, one or more land networks 170, and one or more call centers 180. Mobile vehicle 110 may be a mobile vehicle equipped with suitable hardware and software for transmitting and receiving voice and data communications.

Key fob 120 is wirelessly connected to a telematics unit 130 of mobile vehicle 110 and may send voice commands to telematics unit 130 to perform functions within mobile vehicle 110. Telematics unit 130 may include a digital signal processor (DSP) 132 connected to a wireless modem 134, a global positioning system (GPS) unit 136, an in-vehicle memory 138, optionally a microphone 140, one or more speakers 142, and an embedded or in-vehicle mobile phone 144. DSP 132 may also be referred to as a microcontroller, controller, host processor, or vehicle communications processor. GPS unit 136 may provide longitude and latitude coordinates of the vehicle. In-vehicle mobile phone 144 may be an analog, digital, dual-mode, dual-band, multi-mode or multi-band cellular phone.

DSP 132 may execute various computer programs that control programming and operational modes of electronic and mechanical systems within mobile vehicle 110. DSP 132 may control communications between telematics unit 130, wireless carrier 150, and call center 180. A voice-recognition application may be installed in mobile vehicle 110 and may translate human voice input through microphone 140 to digital signals. The voice-recognition application may be located in DSP 132 or other on-board electronic equipment such as a radio or electronic controller. Alternatively, the voice-recognition application may be installed within key fob 120. DSP 132 may generate and accept digital signals transmitted between key fob 120 and telematics unit 130. These digital signals may activate the programming mode and operation modes, as well as provide for data transfers. Signals from DSP 132 may be translated into voice messages and sent out through speaker 142.

Mobile vehicle 110 via a vehicle communication bus 146 may send signals to various pieces of equipment and systems within mobile vehicle 110 to perform various functions such as unlocking a door, opening the trunk, setting personal comfort settings, and calling from telematics unit 130.

Mobile vehicle 110 via telematics unit 130 may send and receive radio transmissions from wireless carrier system 150. Wireless carrier system 150 may be any suitable system for transmitting a signal from mobile vehicle 110 to communication network 160.

Communication network 160 may comprise services from one or more mobile telephone switching offices and wireless networks. Communication network 160 may connect wireless carrier system 150 to land network 170. Communication network 160 may be any suitable system or collection of systems for connecting wireless carrier system 150 to mobile vehicle 110 and land network 170.

Land network 170 may be a public-switched telephone network. Land network 170 may be an Internet protocol (IP) network. Land network 170 may be comprised of a wired network, an optical network, a fiber network, another wireless network, or any combination thereof. Land network 170 may be connected to one or more landline telephones. Land network 170 may connect communication network 160 to call center 180. Communication network 160 and land network 170 may connect wireless carrier system 150 to a communication node or call center 180.

Call center 180 may contain one or more voice and data switches 182, one or more communication services managers 184, one or more communication services databases 186, one or more communication services advisors 188, and one or more bus systems 190.

Call center 180 may be a location where many calls may be received and serviced at the same time, or where many calls may be sent at the same time. The call center may be a telematics call center, prescribing communications to and from telematics unit 130 in mobile vehicle 110. The call center may be a voice call center, providing verbal communications between an advisor in the call center and a subscriber in a mobile vehicle. The call center may contain each of these functions.

Call center 180 may contain one or more voice and data switches 182. Switch 182 may be connected to land network 170. Switch 182 may transmit voice or data transmissions from call center 180. Switch 182 also may receive voice or data transmissions from telematics unit 130 in mobile vehicle 110 through wireless carrier system 150, communication network 160, and land network 170. Switch 182 may receive from or send to one or more communication services managers 184 data transmissions via one or more bus systems 190. Communication services manager 184 may be any suitable hardware and software capable of providing requested communication services to telematics unit 130 in mobile vehicle 110. Communication services manager 184 may send to or receive from one or more communication services databases 186 data transmissions via bus system 190. Communication services manager 184 may send to or receive from one or more communication services advisors 188 data transmissions via bus system 190. Communication services database 186 may send to or receive from communication services advisor 188 data transmissions via bus system 190. Communication services advisor 188 may receive from or send to switch 182 voice or data transmissions.

Communication services manager 184 may provide one or more of a variety of services, including enrollment services, navigation assistance, directory assistance, roadside assistance, business or residential assistance, information services assistance, emergency assistance, and communications assistance. Communication services manager 184 may transmit data to telematics unit 130 in mobile vehicle 110 through wireless carrier system 150, communication network 160, land network 170, voice and data switch 182, and bus system 190. Communication services manager 184 may also transmit data to key fob 120 through wireless carrier system 150, communication network 160, land network 170, voice and data switch 182, and bus system 190. Communication services manager 184 may store or retrieve data and information from communication services database 186. Communication services manager 184 may transmit data through wireless carrier system 150, communication network 160, land network 170, voice and data switch 182, and bus system 190. Communication services manager 184 may store or retrieve data and information from communication services database 186. Communication services manager 184 may provide requested information to communication services advisor 188.

Communication services advisor 188 may be a real advisor or a virtual advisor. A real advisor may be a human being in verbal communication with a user or subscriber in mobile vehicle 110 via telematics unit 130. A virtual advisor may be a synthesized voice interface responding to requests from telematics unit 130 in mobile vehicle 110.

Communication services advisor 188 may provide services to telematics unit 130 in mobile vehicle 110. Services provided by communication services advisor 188 may include enrollment services, navigation assistance, real-time traffic advisories, directory assistance, roadside assistance, business or residential assistance, information services assistance, emergency assistance, and communications assistance. Communication services advisor 188 may communicate with telematics unit 130 in mobile vehicle 110 through wireless carrier system 150, communication network 160, and land network 170 using voice transmissions, or through communication services manager 184 and switch 182 using data transmissions. Switch 182 may select between voice transmissions and data transmissions.

Key fob 120 may initiate service request to call center 180 by sending a voice command to telematics unit 130 which in turn, sends an instructional signal or a voice call through wireless modem 134, wireless carrier system 150, communication network 160, and land network 170 to call center 180. Alternatively, key fob 120 may send a voice command without telematics unit 130 through wireless carrier system 150, communication network 160, and land network 170 to call center 180. Key fob 120 may also initiate a voice command that is received by telematics unit 130, and a function message that is relayed to the appropriate equipment or controllers in the mobile vehicle to perform a requested function.

In communicating with telematics unit 130, key fob 120 may use wireless networking protocols such as IEEE 802.11b and IEEE 802.15 that operate in the 2.4-GHz industrial, scientific and medical (ISM) band. IEEE 802.11b, often referred to as wireless fidelity (Wi-Fi), is a standard commonly used for communication on wireless local area networks (WLAN). Key fob 120 may also use the lower-powered technology of Bluetooth™ or the IEEE 802.15 protocol, a short-range radio standard often employed in wireless personal area networks (WPAN). Bluetooth™ is particularly suited for wireless connections within 10 meters. WiFi and Bluetooth™ technology allow communication between devices located within approximately 10 to 100 meters of one another.

Figure 2:
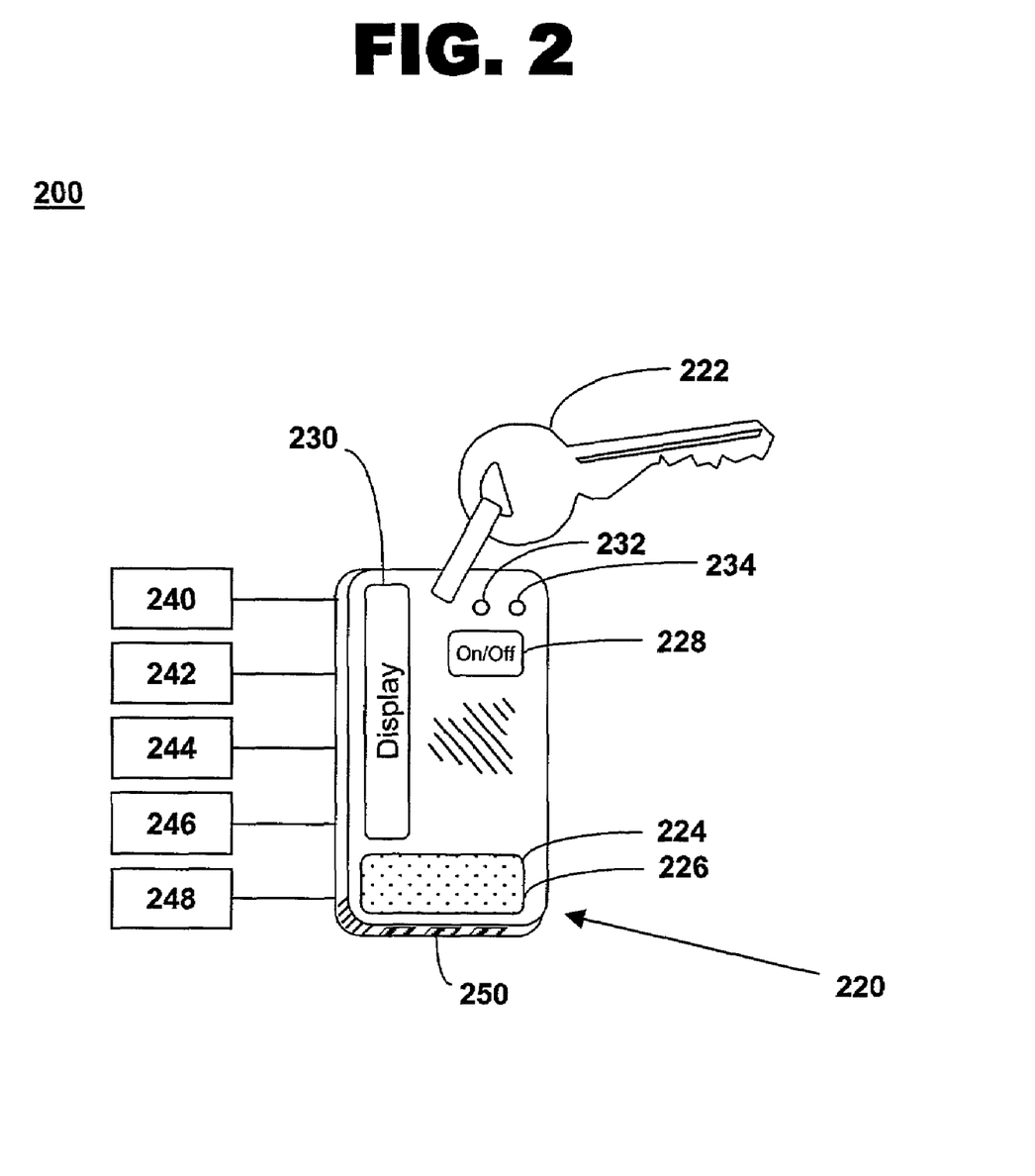
FIG. 2 illustrates one embodiment of a wireless key fob for a mobile vehicle, in accordance with the current invention.

FIG. 2 is an illustration of one embodiment of a wireless key fob for a mobile vehicle, in accordance with the present invention at 200. Key fob 220 is a small hardware device with a size comparable to that of cellular phones or pagers, for example, and dimensions for comfortably fitting into a purse, on a belt, or in a pocket. The key fob may control basic services such as unlocking doors, as well as facilitate higher end services such as defining programmable steering wheel buttons, seat positions and radio stations. The telematics unit in the vehicle may access information stored in the key fob. In one minimalistic embodiment of the wireless key system, key fob 220 contains only a controller, minimal memory, a microphone, and a radio. In another embodiment, key fob 220 contains only a controller, minimal memory, a microphone, and a connector. In other embodiments, key fob 220 may have larger amounts of volatile and non-volatile memory, a faster and more powerful controller, a display, LEDs, a speaker, an on/off button, other user interface mechanisms, and increasingly powerful wireless communication devices and voice-recognition capabilities.

Key fob 220 may have built-in authentication mechanisms to communicate with the telematics unit and vehicle-area network in a specific vehicle. Each key fob 220 may have a unique identifier that the vehicle system uses to authorize vehicle operation. In one embodiment, key fob 220 serves as the primary ignition key for the vehicle, whereby the vehicle cannot be started without the device. Key fob 220 may have an intelligent key containing information about the owner and user preferences, such as favorite radio stations, personal calendar and business contact information.

The mobile vehicle may have several programmed key fobs 220, one for each driver, that secure into a docking mechanism within the vehicle. Each key fob 220 may have authentication information such as a personal identification number (PIN) associated with a specific driver. Additional stored information may include personal comfort settings such as seat position, temperature settings, mirror alignments, and radio-station preferences.

Key fob 220 includes mechanisms to transmit voice commands to a mobile vehicle, thereby requesting that certain functions be performed within the vehicle, and accessing network services and information from the mobile vehicle. When acting as a simple remote control, key fob 220 sends radio frequency signals to the telematics unit to interpret, initiate and perform the requested function. Alternatively, key fob 220 may contain a large amount of memory and processing capability to perform most of the desired functions, while the telematics unit may have only limited processing power and minimal functionality.

Key fob 220 may or may not be linked to one or more keys 222. Key fob 220 is detachable from key 222, which may be an office key, house key, or a valet key with limited functionality for turning on and off the ignition of the mobile vehicle. Key fob 220 may include a directional microphone 224, a speaker 226, an on/off switch 228, a light-emitting-diode (LED) display 230, an LED 232 such as a green LED, an LED 234 such as a red LED, a controller 240, memory 242, a transceiver 244, an antenna 246, a battery 248, and a connector 250 that provides electrical connection to the docking mechanism. Key fob 220 may have a battery 248, such as a lithium ion battery, that is recharged while the key fob is docked in the mobile vehicle or a recharging device. Battery 248 provides power to run microphone 224, speaker 226, LEDs 232 and 234, controller 240, memory 242, and transceiver 244. LEDs may be used as power indicators, lighted green LED 232 meaning a charged battery and red LED 234 meaning a low-charged battery. On/off button 228 may be part of the key-fob design, although buttons or digital input from a keyboard are an optional part of the key fob, because all communications to the mobile vehicle may occur through voice input and voice recognition. Optional LCD display 230 may display text or symbols with transmission information, processing information prompts, command options, confirmation messages from the telematics unit or any other message that might be sent from controller 240. Transceiver 244 may send analog or digital radio signals from the telematics unit and receive the same from the telematics unit via antenna 246. Audio output from the radio transmission or controller 240 may be sent out through speaker 226 or other tone generator.

Key fob 220 may transmit voice commands to the mobile vehicle in several ways depending on the equipment configuration. In one case, voice commands received by microphone 224 may be sent to transceiver 244, which then transmits the voice signals to the telematics unit of the vehicle where the signals are digitized and compared to a list of stored messages to determine the corresponding function message. Another option for a transmission path includes microphone 224 receiving analog voice commands and sending them to controller 240 to be digitized, from where translated digitized voice commands are routed to transceiver 244, which then transmits signals to the in-vehicle telematics unit to be further processed. Voice data may be transmitted, for example, using voice-over-internet-protocol (VOIP) technology.

A third alternative transmission path requires key fob 220 to do most of the information processing. The microphone 224 receives a voice command and sends it to controller 240 where it may be digitized and compared with function messages stored in memory within key fob 220 to identify its corresponding function request. The function message is then sent through transceiver 244 to the telematics unit to perform a requested function.

Depending on the specific configuration and features of the wireless key system, which include computer-processing power, size of memory, and battery power of fob key 220, most of the data processing may occur either at key fob 220 or at the telematics unit. Speech-recognition applications may be used at key fob 220 or the in-vehicle telematics unit to translate voice into digital signals. The digital signals may be compared with a list of stored messages for determining the function message to be transmitted over the vehicle communication bus or sent out to a telematics call center or wireless carrier from the telematics unit. Full-featured key fob 220 may provide data management and cell-phone functionality while away from the mobile vehicle.

Key fob 220 may include controller 240 with computer applications that are optimized to capture speech from the vehicle operator. Other applications may control audio input and output, displays, and other operations of key fob 220. Controller 240 may initiate more complex macro-like sequences to perform a desired function.

Associated with controller 240 is a computer memory 242 such as a solid-state flash memory chip along with volatile memory. Memory 242 may store user preferences or personalized settings, as well as a list of messages that direct the mobile vehicle to perform certain functions. For example, the voice control system of key fob 220 may direct the mobile vehicle to reposition its seats and steering wheel; program steering wheel buttons; adjust seat positions; set climate controls and turn on seat heaters; set the radio or entertainment system to preferred stations; adjust firmness of the suspension; access onboard navigation; connect to an Internet-enabled cellular phone system; unlock or lock doors; and arm or disarm the car alarm system. For example, with the voice command of "9-1-1", key fob 220 corresponds and connects with the telematics unit to place an emergency call.

Memory 242 may have records of vehicle sensor information, which may be used by a diagnostic application in controller 240 to compare with current sensory information sent from the in-vehicle telematics unit in order to diagnose an actual or perceived problem, or to provide maintenance information.

Wireless communication capability between key fob 220 and the telematics unit allows key fob 220 to exploit the capabilities of the telematics unit, which include vehicle-to-vehicle communications, vehicle-area networking, communication to a wireless telecommunication network, communication to a telematics service call center, and communications with consumer devices such as personal digital assistants (PDAs). The key fob may be connected to an Internet-enabled computer or PDA to download additional service applications or change user preferences from the website of a car manufacturer, wireless carrier or telematics service provider, or from a user's personal computer. In addition, when the mobile vehicle is equipped with a digital radio, key fob 220 may use higher bandwidth communication. The network capability of key fob 220 may allow data transmissions into the vehicle from external wireless LANs such as a home network.

Besides communicating to the telematics unit through wireless transmissions, key fob 220 can make a wired hookup via an electrical connector 250 by making electrical and mechanical contact with a docking mechanism in the mobile vehicle. When the key fob is docked, the components in key fob 220 are electronically connected to the telematics unit and vehicle communication bus, and may continue to work while being powered and recharged by the battery of the vehicle.

Figure 3:
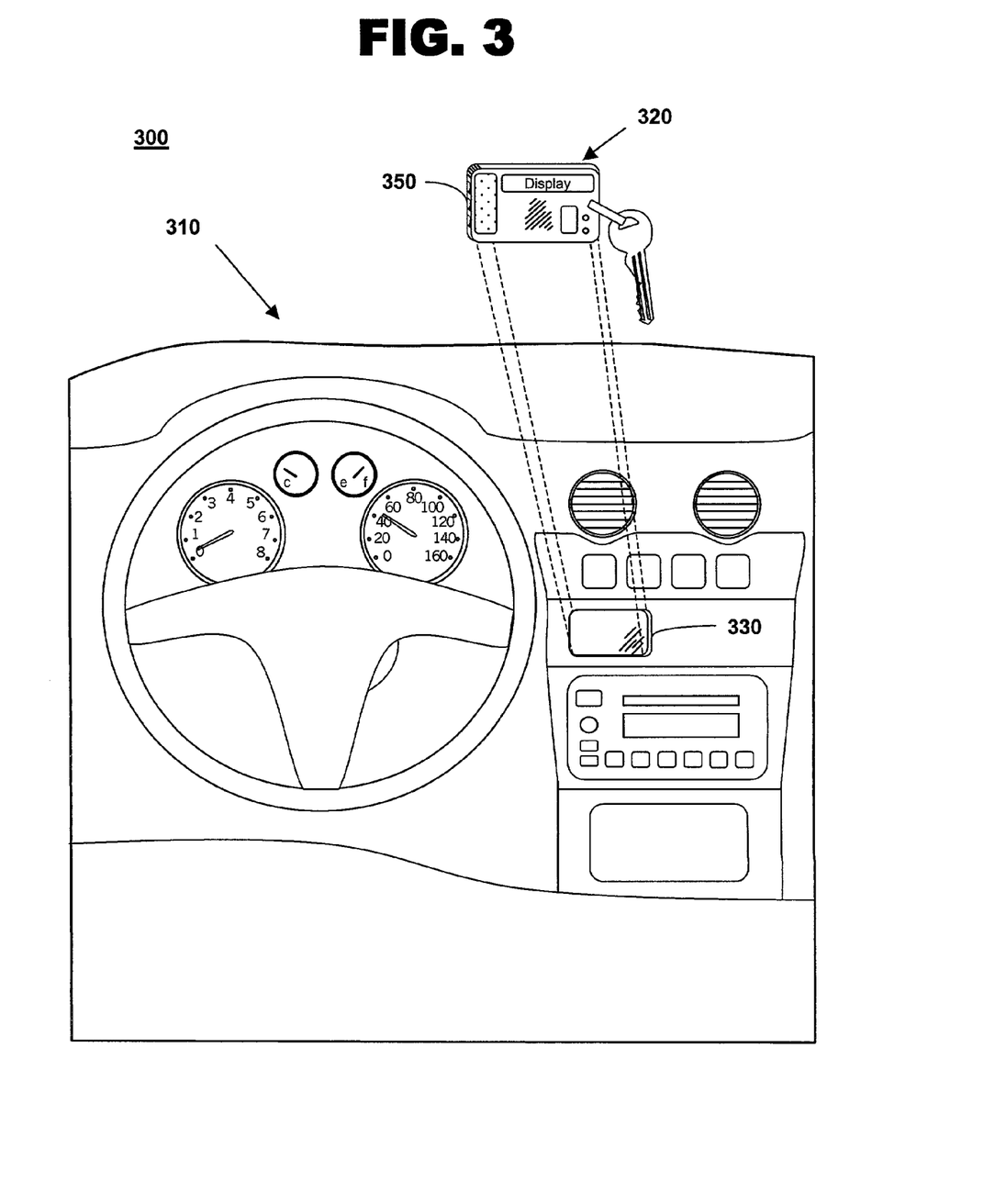
FIG. 3 illustrates one embodiment of a wireless key system with a wireless key and a docking mechanism on vehicle dashboard, in accordance with the current invention.

FIG. 3 shows one embodiment of a wireless key system with a wireless key fob and a docking mechanism on a vehicle dashboard, in accordance with the present invention at 300. The docking mechanism could be installed on or built into the dashboard. One or more docking mechanisms may be installed within the vehicle, for example, at the console, steering column, or any convenient location in the vehicle. Other docking mechanisms or data transfer mechanisms may be located elsewhere such as the doors, hood, or trunk of the vehicle where limited service or function such as opening or unlocking is required.

In one embodiment of the present invention, key fob 320 is docked into a dashboard 310 while the vehicle is in operation. Key fob 320 attaches to the vehicle with a latched, snapped-in, slotted or other securing or docking mechanism 330. Electrical connector 350 on the end or backside of key fob 320 provides an electrical and data conduit or port to connect with the telematics unit and the vehicle bus. Electrical connector 350 may be any suitable connector for establishing and maintaining electrical connections with docking mechanism 330. By selecting a standard-type plug such as a universal-serial-bus (USB) connecter, a user may connect key fob 320 to a personal computer or personal digital assistant that are connected to the Internet to establish, modify, delete or enhance functions. The user of key fob 320 may connect, for example, with the Internet or other network via the electrical connector or through a wireless communication device inside the key fob.

The microphone and speaker of a docked key fob 320 may continue to be used to give verbal communications to the telematics unit, although the communication of key fob 320 may be enhanced by the in-vehicle audio system. While docked, the key fob 320 does not require power to operate and if its battery is dissipated, it still allows the mobile vehicle to be accessed and run.

In one embodiment, key fob 320 is required to be inserted into docking mechanism 330 for the vehicle to run. The use of an individualized key fob 320 improves vehicle security by requiring an authentication mechanism before starting. Key fob 320 may be programmed to require voice input of a personal identification number (PIN) before any vehicle parameters or functions can be accessed or changed. Thus, key fobs, like "smart cards", provide a two-factor authentication: one with the requirement of the physical presence of key fob 320 and the other with the PIN. In one embodiment, key fob 320 acts as the primary vehicle key and requires no additional ignition key.

Key fob 320, when inserted into docking mechanism 330, may continue to receive voice commands and send communication to the telematics by using the vehicle communications bus or a cable between docking mechanism 330 and the telematics unit. Key fob 320 may communicate directly with the vehicle communication bus.

Key fob 320 may be connected to the Internet or other communications networks through the embedded phone in the vehicle. Key fob 320 may be connected to a local area network or a home network through its wireless capability from either inside or outside of the vehicle. When key fob 320 is connected to an Internet-enabled personal computer or personal digital assistant, it may access an Internet site of a call center or another telematics service provider, allowing the user to select user preferences, services options and other programmable functions that are downloaded into its memory. If key fob 320 has too little memory or not enough features or services desired by the user, an upgraded key fob 320 may be obtained and configured for the specific vehicle and the higher-end telematics and vehicle services.

In one of the higher functioning embodiments, key fob 320 may have an embedded phone and may perform similar functions as a personal digital assistant or other small hand-held computers or devices while away from the mobile vehicle. Some examples of full-featured key fob services include the management of personalized data, event and appointment reminders from a personalized calendar, and providing contact information for a person whose name is contained in a personalized contact list. Key fob may also fit into a fob-dockable shell-like housing of an Internet-capable cell phone or PDA. The key fob device may provide enhanced data access and function capabilities of home entertainment systems, gaming stations, set top boxes and personal computers.

Figure 4:
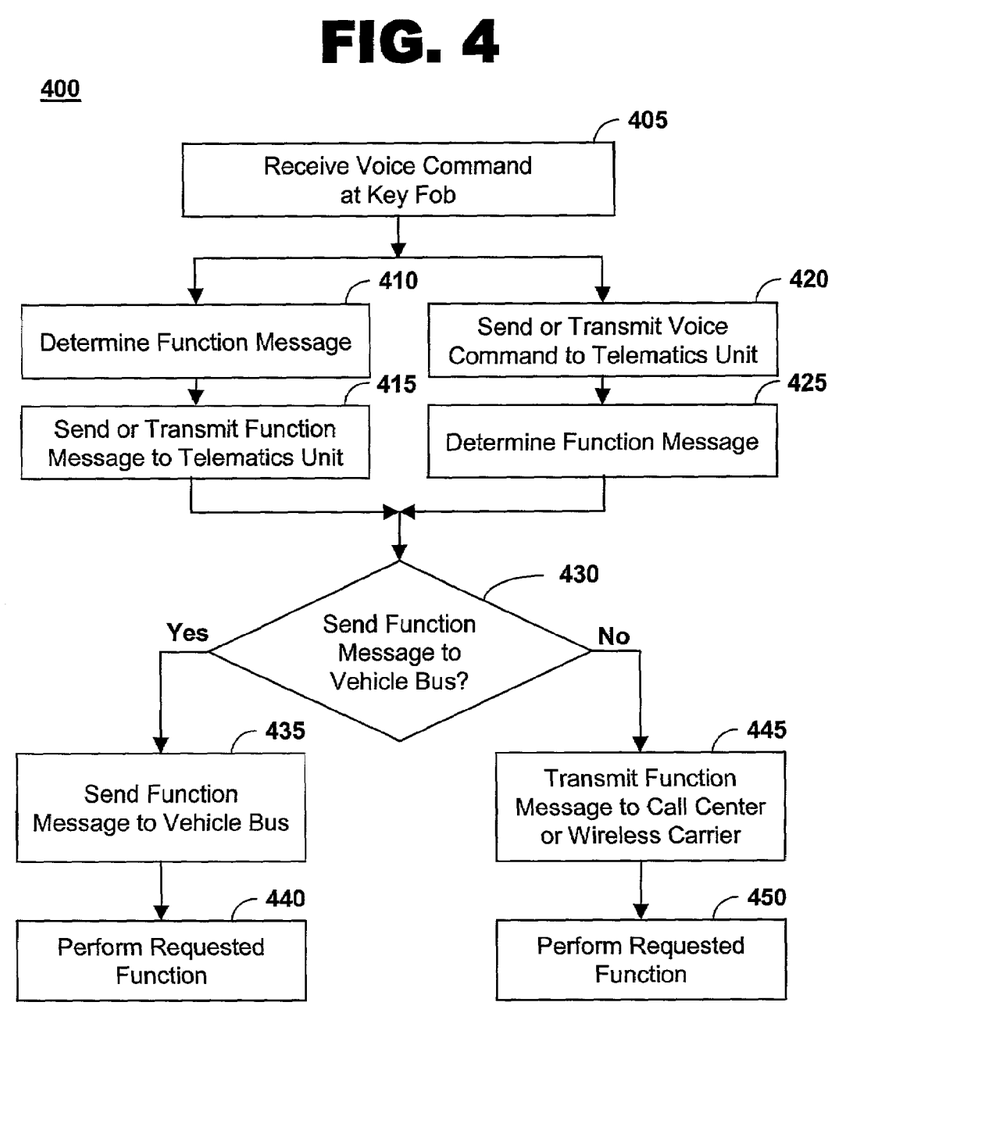
FIG. 4 is a flow diagram of one embodiment of a method for communicating with a mobile vehicle with a key fob equipped with a controller, microphone and memory, in accordance with the current invention.

FIG. 4 is a flow diagram of one embodiment of a method for communicating with a mobile vehicle using a key fob equipped with a controller, microphone and memory, in accordance with the present invention at 400. The key fob is equipped with a controller, microphone and memory. The key fob may also be equipped with a transceiver for wireless communications using a wireless communications protocol. Wireless communications are transmitted and received using any suitable analog or digital communications technologies. The wireless communications between the key fob and the telematics unit may be executed in accordance with a wireless communication protocol such as the IEEE 802.15 (Bluetooth™) or IEEE 802.11 (Wi-Fi) standards. The wireless key system may take advantage of location-based services and IEEE 802.11 hot-spot infrastructure.

One embodiment of a method for communicating with a mobile vehicle begins with receiving a voice command at a key fob, as seen at block 405. The user gives a verbal command that is received through the microphone of the key fob. The voice command may be digitized and compared to a list of stored messages in the memory within the key fob to determine a function message corresponding to the voice command, as seen at block 410. Voice recognition software running on the controller or digital signal processor in the key fob may be used to correlate the voice command to the stored messages. The stored messages may include one or more user preferences, which are preloaded or updated by the user. User preferences include, for example, preset settings for seat and mirror positions, climate control settings, radio-station presets and telematics-unit preferences. A user identifier may be stored in the memory of the key fob, for example, to aid in vehicle operator authentication or to grant pre-authorized services from a telematics service provider.

The controller may then send or transmit a function signal or a function message in accordance with instructions stored in memory to the telematics unit, as seen at block 415. When the key fob is located in a docking station, the function message may be sent through a connector and over electrical wires to the telematics unit. The key fob may be inside the vehicle and secured into its docking mechanism located on the dashboard, in the trunk, in a door or at another convenient location inside the vehicle. The docking mechanism may operably communicate with either the telematics unit or the vehicle communication bus.

When the key fob is not located in the docking station or if no wired communication links are available in the system, communications between the key fob and the telematics unit may use any suitable wireless protocol. The key fob may send the signal to the telematics unit while it is located outside the mobile vehicle within the range of Bluetooth™, Wi-Fi, or another suitable wireless protocol.

Alternatively, the voice command from a user may be received at the key fob, and sent or transmitted directly to the telematics unit using a wireless communication protocol, as seen at block 420. When the key fob is docked, signals and data transfers may occur over prescribed wiring. When the key fob is not docked or no wired communication protocol is available, wireless transmissions may be used to communicate with the telematics unit. The telematics unit may receive wired or wireless communications, and the telematics unit may determine a corresponding function message, as seen at block 425. The telematics unit may digitize the voice command, and compare the digitized voice command to a list of function messages stored in the telematics unit.

Upon receiving the function message from the key fob or upon determining the corresponding function message in the telematics unit, the telematics unit determines whether to send the function message to the vehicle bus, as seen at block 430. When the requested function involves the mobile vehicle, the telematics unit may send the function message to the vehicle bus, as seen at block 435. The digital signal processor of the telematics unit may send a function message through the vehicle communication bus to a designated piece of equipment or vehicle system to perform a requested function. The available functions may include, but are not limited to starting the mobile vehicle, unlocking a door, locking a door, disabling an alarm, enabling an alarm, flashing a light, performing a telematics function, performing a diagnostic function, performing a communication function, or popping open the rear trunk or gas cap cover. The vehicle bus may be interconnected between one or more electronic modules in the vehicle. The appropriate electronic module, as seen at block 440, may perform the requested function. The digital signal processor of the telematics unit may send a function message through the vehicle communication bus to a designated system or subsystem to activate, initiate or perform the requested function.

Alternatively, when the requested function does not require any of the electronic modules on the mobile vehicle, the function message may be transmitted to a wireless carrier or to a call center in accordance with the requested function, as seen at block 445. The wireless carrier or the telematics service call center receives a requested function from a mobile vehicle. The requested function may then be initiated or performed by the wireless carrier or the call center, as seen at block 450. Available functions include, but are not limited to originating a call, performing a telematics function, performing a communication function, and providing network connectivity for intranet and Internet capability. For some requested functions, such as adding more subscriber calling minutes to the embedded phone, the call center may further communicate with the telematics unit through the wireless carrier to perform the requested function.

The key fob may contain extensive wireless communication capability, both LAN and cellular, with substantial control of communication services, diagnostic capabilities, and other telecommunications and vehicular functions. Upgrades to vehicle and communication capabilities may be attained by purchasing an upgraded key or by reprogramming of memory in the key fob to enable enhanced features. An advantage of the wireless key system in the present invention is that services, features, and functions provided in and for a vehicle can change with no or limited modification needed to the communication platform inside the vehicle. It relieves the burden of designing for an automotive environment, including wide temperature, vibration and life cycle specifications, and instead, is limited mainly by design constraints of typical consumer devices like cellular phones and pagers. The key fob may also be secured into additional docking mechanisms that provide PDA and cell phone functionality while away from the mobile vehicle.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A wireless key system for a mobile vehicle, comprising:
    a key fob including a controller, a microphone operably coupled to the controller, and a memory operably coupled to the controller; and
    a telematics unit operably coupled to a vehicle communication bus; wherein verbal commands received through the microphone initiate the controller to send a function message in accordance with instructions stored in the memory to the telematics unit that activates a function through the vehicle communication bus.

2. The system of claim 1 further comprising:
    a wireless communication device operably coupled to the controller, wherein the telematics unit is in wireless communication with the key fob.

3. The system of claim 2 wherein the wireless communication is executed in accordance with one of a Bluetooth standard or an 802.11 standard.

4. The system of claim 1 further comprising:
    a docking mechanism in the mobile vehicle to receive the key fob.

5. The system of claim 4 wherein the docking mechanism is located in at least one location selected from the group consisting of a dashboard, a steering column, a console, a door, and a trunk.

6. The system of claim 4 wherein the docking mechanism operably communicates with one of the telematics unit or the vehicle communication bus.

7. The system of claim 1 further comprising:
    a user identifier stored in the memory of the key fob.

8. The system of claim 1 further comprising:
    a battery in the key fob operably connected to the controller, the microphone, the memory, and the wireless communication device.

9. A method for communicating with a mobile vehicle, comprising:
    receiving a voice command at a key fob;
    determining a function message based on the voice command; and
    sending the function message from a telematics unit to perform a requested function.

10. The method of claim 9 further comprising:
    transmitting the voice command to the telematics unit using a wireless communication protocol.

11. The method of claim 9 wherein the function message is sent to a vehicle communication bus to perform the requested function.

12. The method of claim 9 wherein the function message is sent to one of a call center or a wireless carrier to perform the requested function.

13. The method of claim 9 wherein the requested function is selected from the group consisting of starting the mobile vehicle, unlocking a door, locking a door, disabling an alarm, enabling an alarm, flashing at least one light, originating a call, performing a telematics function, performing a diagnostic function, performing a communication function, providing network connectivity, opening a trunk, and opening a gas cap cover.

14. The method of claim 9 wherein the function message is determined at one of the key fob or the telematics unit.

15. The method of claim 9 wherein determining the function message comprises digitizing the voice command and comparing it to a list of stared messages.

16. The method of claim 15 wherein the stored messages reside in a memory of one of the key fob or the telematics unit.

17. The method of claim 15 wherein the stored messages include at least one user preference.

18. The method of claim 17 wherein the at least one user preference is preloaded into a memory.

19. A computer usable medium including a program for communicating with a mobile vehicle, comprising:
    computer program code to receive a voice command at a key fob;
    computer program code to determine a function message based on the voice command; and
    computer program code to send the function message from a telematics unit to perform a requested function.

20. The computer usable medium of claim 19 further comprising:
    computer program code to transmit the voice command to the telematics unit using a wireless communication protocol.

21. A system for communicating with a mobile vehicle, comprising:
    means for receiving a voice command at a key fob;
    means for determining a function message based on the voice command; and
    means for sending the function message from a telematics unit to perform a requested function.

22. The system of claim 21 further comprising:
    means for transmitting the voice command to the telematics unit using a wireless communication protocol.

* * * * *